United States Patent
Gupta et al.

(10) Patent No.: US 7,014,317 B2
(45) Date of Patent: Mar. 21, 2006

(54) METHOD FOR MANUFACTURING MULTIFOCAL LENSES

(75) Inventors: Amitava Gupta, Roanoke, VA (US); Sean McGinnis, Roanoke, VA (US); William Kokonaski, Gig Harbor, WA (US); Pierre Gerligand, Salem, VA (US)

(73) Assignee: Essilor International (Compagnie Generale d'Optique) (FR)

( * ) Notice: Subject to any disclaimer, the term of this patent is extended or adjusted under 35 U.S.C. 154(b) by 0 days.

(21) Appl. No.: 10/003,991

(22) Filed: Nov. 2, 2001

(65) Prior Publication Data

US 2003/0086056 A1 May 8, 2003

(51) Int. Cl.
*G02C 7/06* (2006.01)

(52) U.S. Cl. ........................... 351/169; 351/177
(58) Field of Classification Search ................ 351/159, 351/168, 169, 170, 171, 172
See application file for complete search history.

(56) References Cited

U.S. PATENT DOCUMENTS

| | | | |
|---|---|---|---|
| 3,563,057 A | 2/1971 | Rosenbauer | |
| 3,934,961 A | 1/1976 | Itoh et al. | |
| 4,898,461 A | * 2/1990 | Portney | 351/169 |
| 5,042,936 A | 8/1991 | Guilino et al. | |
| 5,061,058 A | 10/1991 | Guilino et al. | |
| 5,095,079 A | 3/1992 | Yean et al. | |
| 5,148,205 A | 9/1992 | Guilino et al. | |
| 5,225,057 A | 7/1993 | LeFebvre et al. | |
| 5,258,144 A | 11/1993 | Yean et al. | |
| 5,847,803 A | 12/1998 | Gupta et al. | |
| 5,861,934 A | 1/1999 | Blum et al. | |
| 5,907,386 A | 5/1999 | Gupta et al. | |
| 6,183,084 B1 | * 2/2001 | Chipman et al. | 351/176 |
| 2002/0164484 A1 | * 11/2002 | Jiang et al. | 428/412 |

FOREIGN PATENT DOCUMENTS

| | | |
|---|---|---|
| EP | 1 008 868 A | 6/2000 |
| WO | WO 99/13361 | 3/1999 |
| WO | WO 00/14294 | 3/2000 |

OTHER PUBLICATIONS

PCT International Search Report, dated Jun. 13, 2003, for PCT Int'l. Appln. No. PCT/US02/33204.

* cited by examiner

Primary Examiner—Scott J. Sugarman
(74) Attorney, Agent, or Firm—Fish & Richardson P.C.

(57) ABSTRACT

The present invention provides a method for the manufacture of thin multifocal lenses by deposition of a high refractive index material on a lens substrate.

20 Claims, 1 Drawing Sheet

METHOD FOR MANUFACTURING MULTIFOCAL LENSES

FIELD OF THE INVENTION

The present invention relates to methods for manufacturing multifocal ophthalmic lenses. In particular, the invention provides a method for the manufacture of thin multifocal lenses using high refractive index materials.

BACKGROUND OF THE INVENTION

The use of ophthalmic lenses for the correction of ametropia is well known. For example, multifocal lenses, such as progressive addition lenses ("PAL's"), are used for the treatment of presbyopia. The progressive surface of a PAL provides far, intermediate, and near vision in a gradual, continuous progression of vertically increasing dioptric power from far to near focus, or top to bottom of the lens.

PAL's are appealing to the wearer because PAL's are free of the visible ledges between the zones of differing dioptric power that are found in other multifocal lenses, such as bifocals and trifocals. However, an inherent disadvantage in PAL's is that, due to the incorporation of the power for the near vision zone, the lens' center thickness is increased in comparison to single vision lenses. This makes the PAL less desirable from a cosmetic standpoint to the lens wearer.

One method used to decrease the center thickness of PAL's is to form the lens from a high refractive index material to reduce the sagittal height of the lens. Useful high refractive index materials include certain plastics. Additionally, aluminosilicate or borosilicate glass doped with certain rare earth metals provides a high refractive index material. However, a need exists for alternatives to these methods to reduce the center thickness of a multifocal lens

BRIEF DESCRIPTION OF THE DRAWINGS

FIG. 1 depicts a cross-sectional view of a lens 10 made according to the method of the invention. High index, inorganic material layer 12 is deposited onto substrate 11. Inorganic material 112 includes an intermediate vision zone 13 and a near vision zone 14. In FIG. 2 is epicted a lens 20, a second embodiment of the invention in which the inorganic material is deposited so as to form a refractive index modulation.

DESCRIPTION OF THE INVENTION AND ITS PREFERRED EMBODIMENTS

Figure 1:
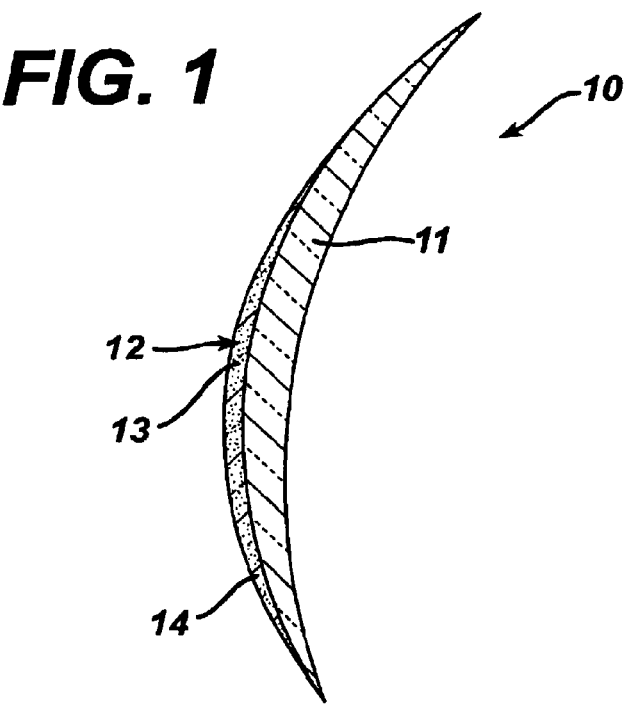
FIG. 1 depicts a cross-sectional view of one embodiment of a lens of the invention.
Figure 2:
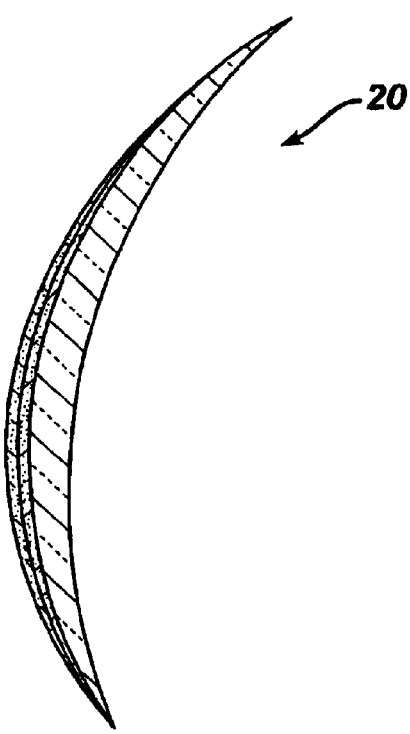
FIG. 2 depicts a cross-sectional view of a second embodiment of the invention.

In the present invention, a method and lenses produced by the method are provided in which the center thickness is reduced compared to conventional multifocal lenses. In addition to a thinner lens, the method of the invention provides lenses having good impact resistance.

In one embodiment, the invention provides a method for manufacturing a multifocal lens comprising, consisting of, and consisting essentially of depositing on at least a portion of a surface of a lens substrate at least one layer of a surface forming amount of a high refractive index material, wherein the material is deposited under conditions suitable to form on the lens substrate surface a near vision zone, an intermediate vision zone, or a combination thereof. In another embodiment, the invention provides a multifocal lens produced by this method. For purposes of the invention a "high refractive index material" is a material having a refractive index of about 1.7 or greater.

The method of the invention may find its greatest utility in the manufacture of progressive addition lenses. For purposes of the invention, by "progressive addition lens" is meant a lens that has at least one progressive addition surface. By "progressive addition surface" or "progressive surface" is meant a continuous, aspheric surface having far and near vision zones and an intermediate vision zone of increasing or decreasing dioptric power connecting the far and near vision zones.

In yet another embodiment, the invention provides a method for manufacturing a progressive addition lens comprising, consisting of, and consisting essentially of depositing on at least a portion of a surface of a lens substrate at least one layer of a surface forming amount of a high refractive index material, wherein the material is deposited under conditions suitable to form on the lens substrate surface a near vision zone and an intermediate vision zone. In another embodiment, the invention provides a lens produced by this method.

The lens substrate used in the method of the invention may be a lens or an optical preform. By "optical preform" is meant a shaped, optically transparent article capable of refracting light and suitable for use in producing a spectacle lens. The lens substrate incorporates either all or a portion of: the spherical power necessary to correct distance vision; the cylinder power; and the prism desired for the lens to be produced. Preferably, the lens substrate incorporates all of the spherical, cylinder and prism power. The substrate may be formed by any known method such as molding, machining, casting, or the like, or combinations thereof. Preferably, the substrate is injection molded.

The lens substrate may be made of any material suitable for use as a spectacle lens material. Illustrative materials include, without limitation, glass, polycarbonates, such as bisphenol A polycarbonates, allyl diglycol carbonates, such as diethylene glycol bisallyl carbonate (CR-39™), allylic esters, such as triallyl cyanurate, triallyl phosphate and triallyl citrate, acrylic esters, acrylates, methacrylates, such as methyl, ethyl, and butyl methacrylates and acrylates, styrenics, polyesters, and the like and combinations thereof. Additionally, the preform may be formed from one or more of the phosphine oxides disclosed in U.S. Pat. No. 6,008,299 incorporated herein in its entirety by reference. Preferably the substrate material has a refractive index of about 1.50 or greater.

Suitable high refractive index material is selected and deposited onto the substrate so that the material: 1.) has an absorption of visible light of less than about 10% at the thickness at which it is used, preferably less than about 5%; and 2.) is capable of forming a scratch and impact resistant, continuous, film with a surface roughness of less than about 15 nm rms and does not change optical transparency, refractive properties, optical clarity, and adhesion to the lens substrate by more than about 5 percent over a 2 or more months of use in typical environmental conditions. Examples of suitable high refractive index materials are shown on the table below, which materials maybe used in combination. The indices of refraction listed are typical values in the visible light range, the actual values being dependent on film processing, stoichiometry, and microstructure. Values for x may be from about 0 to about 2 and for y, from about 0 to about 1.33.

| Material | RI |
|---|---|
| $Si_3N_4$ | 2.03 |
| $SiO_xN_y$ | 1.5–2.0 |
| $ZrO_2$ | 1.88 |
| $Ta_2O_5$ | 2.07 |
| $Al_2O_3$ | 1.77 |
| $TiO_2$ | 1.9–2.3 |
| $Cr_2O$ | 2.24 |
| $Nb_2O_5$ | 2.39 |
| MgO | 1.74 |
| $In_2O_3$—$SnO_2$ | 1.90 |
| $HfO_2$ | 2.07 |
| $Y_2O$ | 1.94 |
| Diamond | 2.42 |
| Diamond-like Carbon | 1.6–2.2 |
| Carbon Nitride | 1.6–2.2 |

Deposition of the high refractive index material may be carried out by any convenient means. Preferably, it is carried out so that a refractive index modulation or refractive index gradient is formed. A refractive index modulation is an oscillatory variation of the index as a function of one of the spatial coordinates, typically the z axis over an orthogonal plane, e.g., the x-y plane. A refractive index gradient is a continuous change in the index similarly measured. The modulation or gradient may be achieved by any convenient method. For example, the modulation may be formed by the alternating deposition of two different compositions, such as a nitride and an oxide of the same metal. A gradient may be formed by the continuous alteration of the composition of the layer as deposition proceeds, such as by varying the ratio of oxygen to nitrogen continuously from pure oxide to pure nitride or by continuously increasing the thickness of the layer deposited.

The deposited high refractive index material must be of a refractive index that differs from that of the substrate by at least 0.1 in the wavelength range of about 400 to about 750 mm. If more than one layer is deposited, the layers must differ from each other by at least 0.1 units of refractive index in the wavelength range of about 400 to about 750 nm. It will be recognized by those ordinarily skilled in the art that the optical correction provided by the deposited high refractive index material will be a function of the product of the added sag height, or layer thickness measured along the z axis, and the refractive index of the material deposited in the form of the layer.

The amount of high refractive index material used be a surface forming amount or an amount suitable for forming on the lens substrate the surface desired based on the material selected. The amount of high refractive index material used must be such that a surface with a thickness ranging from about 0 to about 200 microns, preferably 2 to about 100 microns, is formed. Typically, an amount of from about 10 to about 100 micrograms will be used. The layer preferably is at its thinnest at the geometric center of the lens substrate. Preferably, the thickness of the layer at the substrate's center is about 0 microns.

The high refractive index material deposited need not be deposited over the entire lens substrate surface. Rather, it may be deposited over the area of the substrate's surface at which it is desirable to provide an intermediate vision zone, a near vision zone, or a combination thereof.

Deposition of the high refractive index material may be performed on the back (eye side) surface or front (object side) surface of the lens substrate, or both. Deposition may be carried out by any of a number of methods including, without limitation, sputtering, evaporation, chemical vapor deposition, atomic layer deposition, cathodic arc deposition, ion beam deposition, and the like, and combinations thereof.

In one useful method, the high index material is deposited using a near contact mask with a line-of-sight deposition method, such as sputtering or evaporation. Under vacuum conditions in which the mean free path, or average distance traveled before a collision with another species or the deposition chamber wall, of the depositing species is larger than the dimensions of the deposition system, deposition occurs in a straight line process from the source of the deposition to the substrate being coated. A solid metal mask that is in close proximity, but not touching, the surface prevents the deposited material from being deposited in the area blocked from a straight line view of the deposition source. The mask may have the geometry to imparted to the substrate surface and be fixed or the mask may be moved across the lens surface. The precise process parameters will depend upon the material to be deposited.

In an alternative method, selective deposition is carried out using laser-induced chemical vapor deposition. A glass or metal vacuum chamber is used to contain the lens substrate, which chamber has a laser port at least about 75 mm in diameter so that the beam can be focused to all positions on the substrate surface. The chamber is filled with an organo-metallic chemical precursor. Suitable precursors are those capable of undergoing decomposition by specific light wavelengths that are accessible using commercially available lasers. The interaction of the precursor with the laser results in chemical decomposition and deposition of the high index material. The rate of deposition used is greater than about 10 nm/sec. Illustrative precursors include, without limitation, $CH_3I$, $SiH_4$, $N_2O$, $TiCl_4$ and the like and combinations thereof. The laser beam is moved continuously across the substrate surface in a pattern and at a speed that provides the desired geometry and thickness.

In yet another deposition method, material is selectively removed to produce the desired surface geometry and thickness. A layer of the high index material approximately uniform in thickness is deposited on the substrate surface using vacuum deposition such as, without limitation, sputtering, evaporation, chemical vapor, plasma, or the like, or combinations thereof The deposited layer is then subjected to ion beam, laser, or another energy source that is capable of removing the high index material by ablation, vaporization, or the like. A near contact mask may be used.

In all of the above-described deposition methods, deposition may be controlled by a feedback mechanism that enables deposition of a complex surface geometry conforming to a polynomial or sum of polynomials each describing a segment of the surface and smoothed over at the boundaries by means of splines or other fitting routines. Suitable feedback mechanisms include, without limitation, a reflectance measurement using a fiber optic light source and detector. Using a focused light source with a spot size of less than about 1 mm and preferably about 100 microns, the deposited layer thickness may be measured accurately as deposited. The information is fed back to the deposition system using a proportional integral derivative process controller. Alternatively, the actual focal length of the entire lens at a given position may be measured using a focused light source and detector, the light source spot size being less than about 1 mm. The focal length of the lens may be measured and compared to the desired focal length at various positions across the lens.

As an alternative embodiment of the invention, the deposited layer may extend over the entire substrate surface and provide correction for higher order, meaning third order or above, optical aberrations including, without limitation, spherical aberration, oblique astigmatism, and coma. These optical corrections may be provided by adjusting the added sag height of a single layer. Alternatively, more than one layer may deposited and the surface topography of the interface between the two layers is adjusted to provide the surface geometry required to provide the desired optical aberration correction. As yet another alternative, the refractive index of the deposited layer or layers may be varied in order to provide the desired optical aberration corrections. Thus, in another embodiment, the invention provides a method for manufacturing a lens capable of correcting at least one higher order ocular aberration comprising, consisting of, and consisting essentially of depositing on at least a portion of a surface of a lens substrate at least one layer of a surface forming amount of a high refractive index material, wherein the material is deposited under conditions suitable to form a surface capable of correcting the at least one higher order optical aberration.

In carrying out this embodiment of the invention, a perform having a progressive addition surface with the desired locations of the far, intermediate and near vision zones is used, which preform has higher order optical aberrations that need to be removed. The surface of the perform is mapped to determine the sag values, or x, y, z coordinates, of the surface relative to a reference surface in the x, y plan, choosing points at which sag measurements are made about every 0.1 to about 1.0 mm. The sag table is divided into a grid covering the surface, the grid being any of a variety of geometrical figures including, without limitation, triangles, rectangles or squares, and the like, the size of each segment being no less than 1 mm and no more than 8 mm.

For each segment, the desired object distance from the target object distance is about 45 cm at the near vision zone and about 60 cm at the intermediate vision zone. The sag values for each segment is determined for all points in the segment that will provide the best spherocylindrical correction for the desired object distance at that segment and the spherocylindrical and prismatic correction required by the lens wearer's prescription. The difference in measured and computed sag values of every point at each segment is determined and re-computed by taking into account the refractive index of the high refractive index material to be deposited. The sag values of the points bordering each segment are compared with those of neighboring segment in order to determine the discontinuities in sag values and slopes at the borders of each segment.

The sag values of all points in each segment are altered until the discontinuities in sag values are reduced to a value less than that can be perceived by the human eye, about 0.1 micron or less, and discontinuity of slope is reduced to a value less than that can be perceived by the human eye in the form an image jump, about 0.1 degree or less. The best fit for the new surface in each segment is determined in relation to the spherocylindrical surface and the steps of the process repeated as necessary and through as many iterations as needed, until no further changes in sag values occur. Once the sag values of all points at each segment is known, the layer of high refractive index material is deposited to the required thickness.

What is claimed is:

1. A method for manufacturing a progressive addition spectacle lens, comprising depositing on at least a portion of a surface of a lens substrate at least one layer of surface forming amount of an inorganic high refractive index material, wherein the material is deposited under conditions suitable so that the material forms on the lens substrate surface a progressive surface.

2. The method of claim 1, wherein the inorganic high refractive index material is deposited on the entire surface of the lens substrate.

3. The method of claim 1, or 2, wherein the inorganic high refractive index material is selected from the group consisting of $Si_3N_4$, $SiO_xN_y$, $ZrO_2$, $Ta_2O_5$, $Al_2O_3$, $TiO_2$, $Cr_2$, $Nb_2O_5$, $MgO$, $In_2O_3$—$SnO_2$, $HfO_2$, $Y_2O$, diamond diamond-like carbon, nitride and combinations thereof, wherein x is about 0 to about 2 and y is about 0 to about 1.33.

4. The method of claim 3, wherein the deposition is carried out so that a refractive index modulation is formed.

5. The method of claim 3, wherein the deposition is carried out so that a refractive index gradient is formed.

6. A progressive addition spectacle lens produced by the method of claim 1, or 2.

7. A progressive addition spectacle lens produced by the method of claim 3.

8. A progressive addition spectacle lens produced by the method of claim 4.

9. A progressive addition spectacle lens produced by the method of claim 5.

10. A method for manufacturing a progressive addition spectacle lens capable of correcting at least one higher order ocular aberration, comprising depositing on at least a portion of a surface of a lens substrate at least one layer of a surface forming amount of an inorganic high refractive index material, wherein the material is deposit under conditions suitable so that the materials forms a surface capable of correcting the at least one higher order optical aberration.

11. The method of claim 10, wherein the inorganic high refractive index material is deposited on the entire surface of the lens substrate.

12. The method of claim 10, wherein the inorganic high refractive index material is deposited on the entire surface of the lens substrate.

13. The method of claim 10, 11, or 12, wherein the inorganic high refractive index material is selected from the group consisting of $Si_3N_4$, $SiO_xN_y$, $ZrO_2$, $Ta_2O_5$, $Al_2O_3$, $TiO_2$, $Cr_2O$, $Nb_2O_5$, $MgO$, $In_2O_3$—$SnO_2$, $HfO_2$, $Y_2O$, diamond, diamond-like carbon, nitride and combinations thereof, wherein x is about 0 to about 2 and y is about 0 to about 1.33.

14. A progressive addition spectacle lens produced by the method of claim 10, 11 or 12.

15. A progressive addition spectacle lens produced by the method of claim 13.

16. A progressive addition spectacle lens, comprising a substrate and at least one layer of a surface forming amount of an inorganic high refractive index material deposited on at least a portion of a surface of the substrate, wherein the inorganic high refractive index material forms progressive surface.

17. Th lens of claim 16, wherein the inorganic high refractive index material is deposited on the entire surface of the lens substrate.

18. The method of claim 16 or 17, wherein the inorganic high refractive index material is selected from the group consisting of $Si_3N_4$, $SiO_xN_y$, $ZrO_2$, $Ta_2O_5$, $Al_2O_3$, $TiO_2$, $Cr_2O$, $Nb_2O_5$, $MgO$, $In_2O_3$—$SnO_2$, $HfO_2$, $Y_2O$, diamond, diamond-like carbon, nitride and combinations thereof, wherein x is about 0 to about 2 and y is about 0 to about 1.33.

19. The lens of claim 18, wherein the inorganic high refractive index material forms a refractive index modulation.

20. The lens of claim 18, wherein the inorganic high refractive index material deposition forms a refractive index gradient.

* * * * *